US012089562B2

(12) United States Patent
Nga et al.

(10) Patent No.: US 12,089,562 B2
(45) Date of Patent: *Sep. 17, 2024

(54) CLUMPING ANIMAL LITTER AND METHOD THEREOF

(71) Applicant: THE CLOROX COMPANY, Oakland, CA (US)

(72) Inventors: Perry Nga, Pleasanton, CA (US);
David Lyons, Pleasanton, CA (US);
Ahmed Drief, Pleasanton, CA (US);
Kaitlin Lawler, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,514

(22) Filed: May 17, 2023

(65) Prior Publication Data
US 2024/0156046 A1    May 16, 2024

Related U.S. Application Data

(63) Continuation of application No. 17/365,905, filed on Jul. 1, 2021, now Pat. No. 11,684,035, which is a continuation of application No. 16/460,780, filed on Jul. 2, 2019, now Pat. No. 11,076,576, which is a
(Continued)

(51) Int. Cl.
| *A01K 1/015* | (2006.01) |
| *B01J 20/04* | (2006.01) |
| *B01J 20/12* | (2006.01) |
| *B01J 20/20* | (2006.01) |
| *B01J 20/28* | (2006.01) |
| *B01J 20/30* | (2006.01) |

(52) U.S. Cl.
CPC .......... *A01K 1/0154* (2013.01); *A01K 1/0155* (2013.01); *B01J 20/043* (2013.01); *B01J 20/12* (2013.01); *B01J 20/20* (2013.01); *B01J 20/28016* (2013.01); *B01J 20/3028* (2013.01)

(58) Field of Classification Search
CPC .. A01K 1/0154; A01K 1/0155; A01K 1/0152; A01K 1/015
See application file for complete search history.

(56) References Cited

U.S. PATENT DOCUMENTS

| 4,355,593 A | 10/1982 | Stapley |
| 4,640,225 A | 2/1987 | Yananton |
| 4,671,208 A | 6/1987 | Smith |
(Continued)

FOREIGN PATENT DOCUMENTS

| CA | 2774092 A1 | 10/2012 |
| EP | 3180976 A2 | 6/2017 |
| WO | 2013/109599 A1 | 7/2013 |

OTHER PUBLICATIONS

Final Office Action, U.S. Appl. No. 15/409,308, dated Sep. 21, 2018.
(Continued)

*Primary Examiner* — Trinh T Nguyen
(74) *Attorney, Agent, or Firm* — Workman Nydegger

(57) ABSTRACT

A clumpable animal litter comprises composite particles of filler materials, such as limestone and sand, and sodium bentonite. The filler materials have a lower bulk density as compared to a granular mixture of the same percentage of filler and sodium bentonite clay and contain up to eighty-five percent less clay.

20 Claims, 5 Drawing Sheets

Elemental map as a function of Limestone (LS) content

Clay mapped by silicon (Si)
Limestone mapped by calcium (Ca)

40% LS

50% LS

60% LS

70% LS

80% LS

● Samples up to 60% LS seem to have a greater or equivalent amount of clay on the surface
● Samples with 70% and 80% LS have segregation of LS particles on the surface

Related U.S. Application Data continuation of application No. 15/409,308, filed on Jan. 18, 2017, now Pat. No. 10,383,308.

(60) Provisional application No. 62/286,200, filed on Jan. 22, 2016.

(56) References Cited

U.S. PATENT DOCUMENTS

| | | |
|---|---|---|
| 4,756,273 A | 7/1988 | Yananton |
| 4,869,204 A | 9/1989 | Yananton |
| 5,295,456 A | 3/1994 | Lawson |
| 5,303,676 A | 4/1994 | Lawson |
| 5,421,291 A | 6/1995 | Lawson et al. |
| 5,927,049 A | 7/1999 | Simard |
| 6,015,547 A | 1/2000 | Yam |
| 6,276,300 B1 | 8/2001 | Lewis et al. |
| 6,354,243 B1 | 3/2002 | Lewis et al. |
| 6,860,234 B2 | 3/2005 | Raymond et al. |
| 6,962,129 B1 | 11/2005 | Lawson |
| 7,429,421 B2 | 9/2008 | Greene et al. |
| 7,665,418 B2 | 2/2010 | Bracilovic |
| 7,856,946 B2 | 12/2010 | Burckbuchler, Jr. |
| 8,156,896 B2 | 4/2012 | Wadams et al. |
| 8,273,676 B2 | 9/2012 | Falcone et al. |
| 8,584,617 B2 | 11/2013 | Greene et al. |
| 8,720,375 B2 | 5/2014 | Miller et al. |
| 8,722,031 B2 | 5/2014 | Lawson et al. |
| 8,733,288 B2 | 5/2014 | Winkleman et al. |
| 8,881,681 B2 | 11/2014 | Zhang |
| 8,904,963 B2 | 12/2014 | Dixon et al. |
| 9,010,273 B2 | 4/2015 | Adamy et al. |
| 9,072,276 B2 | 7/2015 | Pechera et al. |
| 9,119,374 B2 | 9/2015 | Bracilovic et al. |
| 9,398,754 B2 | 7/2016 | Zhang et al. |
| 9,986,714 B2 | 6/2018 | Huck et al. |
| 10,383,308 B2 | 8/2019 | Nga et al. |
| 11,076,576 B2 | 8/2021 | Nga et al. |
| 11,684,035 B2 | 6/2023 | Nga et al. |
| 2005/0005869 A1 | 1/2005 | Fritter et al. |
| 2006/0042553 A1 | 3/2006 | Venezio |
| 2011/0185977 A1 | 8/2011 | Dixon et al. |
| 2012/0318205 A1 | 12/2012 | Kuras et al. |
| 2013/0239901 A1 | 9/2013 | Pechera et al. |
| 2013/0266657 A1 | 10/2013 | Trajkovska |
| 2013/0269623 A1 | 10/2013 | Lawson |
| 2013/0305997 A1 | 11/2013 | Miller et al. |
| 2015/0181831 A1 | 7/2015 | Huck et al. |
| 2018/0064059 A1 | 3/2018 | Brown et al. |

OTHER PUBLICATIONS

Final Office Action, U.S. Appl. No. 16/460,780; dated Dec. 21, 2020.
Non-final Office Action received for U.S. Appl. No. 17/365,905, mailed on Oct. 5, 2022, 14 pages.
Non-Final Office Action, U.S. Appl. No. 15/409,308; dated Feb. 21, 2019.
Non-Final Office Action, U.S. Appl. No. 15/409,308; dated Mar. 8, 2018.
Non-Final Office Action, U.S. Appl. No. 16/460,780; dated Jun. 26, 2020.
Notice of Allowance received for U.S. Appl. No. 17/365,905, mailed Feb. 21, 2023, 7 pages.

CLUMPING ANIMAL LITTER AND METHOD THEREOF

CROSS REFERENCE TO RELATED APPLICATIONS

This application is a continuation of U.S. application Ser. No. 17/365,905, filed Jul. 1, 2021, which is a continuation of U.S. application Ser. No. 16/460,780, filed Jul. 2, 2019, now U.S. Pat. No. 11,076,576, which is a continuation of U.S. application Ser. No. 15/409,308, filed Jan. 18, 2017, now U.S. Pat. No. 10,383,308, which claims the benefit of U.S. Provisional Application No. 62/286,200, filed Jan. 22, 2016, all of which is hereby incorporated by reference in their entirety.

THE FIELD OF THE INVENTION

Disclosed herein are clumpable animal litters. Specifically, disclosed herein are animal litters comprising composite particles of filler materials, such as limestone and sand, and sodium bentonite that perform as well as traditional clay-based, clumping litters, yet have a lower bulk density as compared to a granular mixture of the same percentage of filler and sodium bentonite clay and contain up to eighty-five percent less clay.

RELATED ART

Clay has long been used as a liquid absorbent and has found particular usefulness as an animal litter. Typically, the clay is mined, dried, and crushed to the desired particle size. Some clay litters have the ability to clump upon wetting. For example, sodium bentonite is a water-swellable clay which, upon contact with moist animal waste, is able to agglomerate with other moistened sodium bentonite clay particles. The moist animal waste is contained by the agglomeration of the moist clay particles into an isolatable clump, which can be removed from the container (e.g., litter box) housing the litter. The clump strength of clay litters containing equal or greater than ninety percent sodium bentonite are strong enough to hold the clump shape upon contact with moisture and retain that shape upon scooping without pieces of the litter breaking off of the clump and remaining in the litter box, allowing waste therein to create malodors. However, sodium bentonite clay is very heavy and is mined. As such, it is a limited resource.

Another problem inherent in typical sodium bentonite clay litters is the inability to effectively control malodors. Clay has very poor odor-controlling qualities, and inevitably waste build-up leads to severe malodor production. What is needed is an animal litter that uses less sodium bentonite with effective odor-controlling properties.

Accordingly, what is needed is an absorbent material suitable for use as an animal litter that uses less sodium bentonite, yet has clumping characteristics equivalent to clay-based litters that contain at least ninety percent sodium bentonite. What is further needed is an animal litter with odor-controlling properties that has clumping properties comparable to clay-based litters containing greater than ninety percent sodium bentonite, yet that requires much lower concentrations of sodium bentonite. What is further needed is an animal litter containing composite particles of sodium bentonite and filler material (e.g., limestone) that has lower bulk density relative to an animal litter containing the same percentage of a dry blend of sodium bentonite and filler material.

U.S. Pat. No. 4,671,208 discloses an absorbent cat litter that contains clay and limestone. US2006042553 discloses a cat litter that contains ground limestone and a thickener that is digestible by cats. Neither discloses an animal litter with the odor-controlling, bulk densities and clumping properties disclosed herein.

DETAILED DESCRIPTION OF THE PREFERRED EMBODIMENTS

Figure 1:
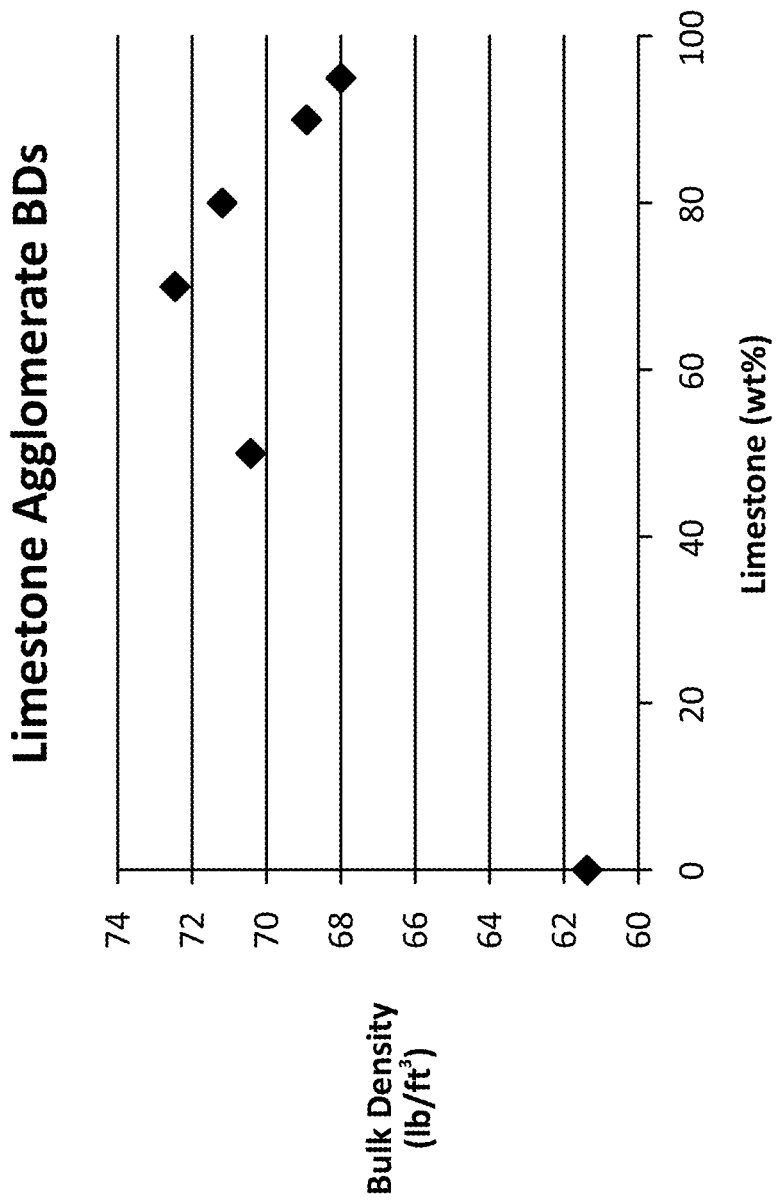
FIG. 1 shows the non-linear relationship between limestone content and bulk density of the composite particles.

Before describing embodiments of the present invention in detail, it is to be understood that all publications, patents and patent applications cited herein, whether supra or infra, are hereby incorporated by reference in their entirety to the same extent as if each individual publication, patent or patent application was specifically and individually indicated to be incorporated by reference in its entirety.

It must be noted that, as used in this specification and the appended claims, the singular forms "a," "an" and "the" include plural referents unless the content clearly dictates otherwise. Thus, for example, reference to an "additive" includes two or more such additives.

Unless defined otherwise, all technical and scientific terms used herein have the same meaning as commonly understood by one of ordinary skill in the art to which the invention pertains. Unless otherwise stated, amounts listed in percentage ("%'s") are in weight percent.

Disclosed herein are composite absorbent particles that comprise a sodium bentonite component and a "filler material" (as defined herein) component. Optionally, additives, such as, powdered activated carbon "PAC" (as defined herein), can also be added to the composite absorbent particles.

The composite absorbent particles have improved physical and chemical properties such that a litter can be produced without compromising the performance of traditional clumping clay-based litters that contain equal or greater than ninety percent sodium bentonite. Although sodium bentonite-based litters clump well, they also have disadvantages. Sodium bentonite is relatively expensive, limited in terms of geographic availability, and not a renewable resource.

Disclosed herein are composite absorbent particles comprising between about thirty and about seventy percent by weight sodium bentonite that maintain the clumping benefit of "pure sodium bentonite" (as defined herein). In one an embodiment, a composite particle animal litter is disclosed that comprises as little as twenty percent by weight sodium bentonite, yet retains the majority of the clump strength of pure sodium bentonite litter. In preferred embodiments, a composite particle animal litter is disclosed that comprises as little as thirty percent by weight sodium bentonite, yet retains the clump strength of pure sodium bentonite litter. A high shear agglomeration process may be used to make the composite particles disclosed herein, such as pin mixing.

As used herein the term "pure sodium bentonite litter" means a clumping clay-based litter that contains equal or greater than ninety percent by weight sodium bentonite. As used herein, the term "granular sodium bentonite" means sodium bentonite clay that is either (a) mined, crushed and sieved or (b) processed by methods know in the industry to a suitable particle size (about 3 mm to about 0.4 mm) to be used as clumping animal litter. As used herein the term "composite particle" means a discrete particle that is formed by the combination of smaller component particles.

As used herein the term "PAC" means powdered activated carbon that is a fine black powder made from wood or other carbon-containing materials (e.g., coconut, coal, etc.) that have been exposed to very high temperatures in an airless environment and treated, or activated, to increase its ability to absorb by reheating with oxidizing gas or other chemicals. The result is a highly porous fine powder with a particle size less than about 0.25 mm and typically ranging from about 50 to about 150 microns.

As used herein the term "clump strength" means the percentage of particles retained in the clump after three hours using the clump strength test method described herein.

As used herein the term "high shear agglomeration process" means a high speed, conditioning and micro-pelletizing device that converts powder into small agglomerates through the action of a high speed and the addition of water. As used herein the term "component" when used in conjunction with a composite particle means a small particle of one material that was combined with other small particles of itself and/or of small particles of different materials to form a composite particle. As used herein the term "spacer material" means an agent that helps spread sodium bentonite on the surface of a filler material component for better distribution of the sodium bentonite during the agglomeration process.

As used herein the term "binder" means a substance that causes the composite particles to better adhere to each other upon contact with a liquid, such as water or urine, to form a strong clump. Examples of binders include guar gum, starch, modified starch, natural hydrocolloids, alginates, acrylates, and polyvinyl acetate. Particle size ranges are determined by screening methods known in the art.

Filler Materials

As used herein, the term "filler material" means a non-absorbent material that is more readily available than bentonite and used to replace a portion of a more expensive or scarce component of a cat litter formulation. Examples of suitable filler materials include limestone, dolomite, calcite, calcium carbonates, sand, shale, gravel, slate.

High shear agglomeration processes includes pin mixers, pelletizers, extruders, etc. . . . such an agglomeration process can be used to form discrete composite particles. Pin mixing is a pin-type, high speed, conditioning and micro-pelletizing device that converts small particles ("components") into discrete agglomerates ("composite particles") through the action of high speed and the addition of water.

Sodium Bentonite

Sodium bentonite powder having a mean particle size less than about 0.25 mm is preferred. Sodium bentonite expands when wet, absorbing as much as several times its dry mass in water. The main mineral that forms bentonite is Montmorillonite $((Na,Ca)_{0.33}(Al,Mg)_2(Si_4O_{10})(OH)_2 \cdot nH_2O)$. Sodium Montmorillonite (Na-montmorillonite), in particular, expands considerably more than other clays, e.g., Calcium Montmorillonite (CA-montmorillonite) due to water penetrating the interlayer molecular spaces and concomitant adsorption. The presence of sodium as the predominant exchangeable cation can result in the clay swelling to several times its original volume. Hence, its application in animal litters.

Adding a small amount of binder, such as guar gum, in an amount as little as 0.1 percent by weight can increase the clump strength of the resulting litter in some cases by up to ten percent. Preferred binders include guar gum, starch, polyacrylates, polysaccharides, and alginates. Guar gum ("guar") is particularly preferred because it is a powdered solid that helps form strong and rigid clumps when wet and tends to be very evenly distributed throughout the resulting composite particles. Thus, a very small amount of guar can have a considerable impact. Binders, such as guar, are known for their binding properties. They have been used in several cat litters to facilitate the adhesion between particles thus, clumping. However, none of these composite particles (e.g., filler materials, such as limestone or sand and guar, even in much higher concentrations) could achieve the high absorption and immediate clumping of sodium bentonite.

On the other hand, when using a high shear agglomeration process to mix sodium bentonite with a filler material, such as limestone or sand, the resulting composite particles are strong and clump and absorb liquid as well as pure sodium bentonite.

The composite particles are formed using a filler material component preferably having a mean particle size no greater than 0.5 mm (preferably ranging from about 0.074 mm to about 0.42 mm) and a sodium bentonite component preferable having a mean particle size no greater than about 0.25 mm and optionally a PAC component.

The animal litter disclosed herein comprises limestone in an amount ranging from about 20 percent to about 80 percent (preferably from about 30 percent to about 70 percent and most preferably from about 40 percent to about 60 percent), sodium bentonite in an amount ranging from about 80 percent to about 20 percent (preferably from about 70 percent to about 30 percent and most preferably from about 60 percent to about 40 percent) by weight, and optionally PAC in an amount ranging about 0.1 to about 2 percent (preferably from about 0.3 to about 1 percent by weight). Higher amounts of PAC can be used, but generally are not cost effective. Embodiments of such animal litter can include (1) a dry blend of absorbent material suitable for use as an animal litter (e.g., sodium bentonite clay) and filler material/sodium bentonite composite particles, (2) a dry blend of absorbent material suitable for use as an animal litter (e.g., sodium bentonite clay) and filler material/sodium bentonite/PAC composite particles, (3) a dry blend of absorbent material suitable for use as an animal litter (e.g., sodium bentonite clay), filler material/sodium bentonite composite particles, and sodium bentonite/PAC composite particles, (4) filler material/sodium bentonite composite particles, (5) filler material/sodium bentonite/PAC composite particles, (6) a dry blend of filler material/sodium bentonite composite particles and filler material/sodium bentonite/PAC composite particles, and combinations or modifications thereof. In embodiments where the animal litter comprises dry blends of absorbent material and composite particles, the amounts of the filler material component, the sodium bentonite component and the carbon component in the pre-blend mixture to form the composite particles would be adjusted accordingly to provide the desired percentages of each in the resulting litter composition.

Embodiments of composite particles can comprise a filler material component in an amount ranging from about 20 percent to about 80 percent (preferably from about 30 percent to about 70 percent and most preferably from about 40 percent to about 60 percent) by weight and a sodium bentonite component in an amount ranging from about 80 percent to about 20 percent (preferably from about 70 percent to about 30 percent and most preferably from about 60 percent to about 40 percent) by weight. Relative to each other, the resulting composite particles all contain approximately the same level of the two components (clay and filler material) which allows for an efficient use of the sodium bentonite so that the amount of sodium bentonite can be significantly reduced without substantially sacrificing the clump strength and liquid absorbtion of the litter because the contact between component particles of the composite particle is maximized.

Additionally, PAC can be included in the composite particles. As used herein the term "bentonite/filler material/PAC composites" is defined as a composite particle comprising a filler material component, a sodium bentonite component, and a PAC component. As with the filler material/sodium bentonite composite particles, the resulting filler material/sodium bentonite/PAC composite particles all contain (relative to each other) approximately the same level of the three components (clay, filler material and PAC) such that the odor control efficacy of the carbon is not sacrificed because the distribution of the PAC within the composite particles is maximized. It is desired that the amount of PAC in the animal litter is an amount ranging from about 0.1 to about 2 percent (preferably about 0.3 percent to about 1 percent). If the litter will be comprised primarily of composite particles, then the appropriate amount of carbon component would be added to the composite particle pre-blend. If the litter was intended to be a dry blend of composite particles and absorbent material suitable for use as an animal litter (e.g., sodium bentonite), then the amount of each component in the pre-blend would be adjusted accordingly.

Optionally, a guar gum component in an amount ranging from 0 percent to about 1 percent by weight may be included.

It was anticipated that using a high shear agglomeration process to agglomerate a mineral-based material such as a limestone or sand and a sodium bentonite component would result in a composite particle having a significantly higher attrition than pure sodium bentonite. Contrary to this expectation, Table 1 below shows that the attrition of these composite particles is comparable to that of pure sodium bentonite.

In addition, it has unexpectedly been found that the clump strength of a sample litter made by pin-mixing a sodium bentonite component and a limestone component to form a litter comprising sodium bentonite/limestone composite particles is very near to that of pure sodium bentonite.

Without being bound by theory, it is believed that the filler material (e.g., limestone, sand) components have a very limited capacity to absorb liquids as compared to clays. It is therefore believed that the liquid will be channeled past the filler components in each composite particle and selectively absorbed by the sodium bentonite, with the net result of more optimal usage of the sodium bentonite absorbancy. This leads to a comparable clump strength and liquid absorption to a pure sodium bentonite cat litter. It is expected that a similar phenomenon will occur even if just a portion of the litter contains the composite particles (e.g., a litter composition comprising a dry blend of sodium bentonite and filler material/sodium bentonite composite particles).

Bulk density is another important property of animal litter. Bulk density is a property of powders, granules and other "divided" solids, especially used in reference to mineral components. It is defined as the mass of the many particles of the material divided by the total volume they occupy. The total volume includes particle volume, interparticle void volume and internal pore volume. Bulk density is not an intrinsic property of a material; it can change depending on how the material is handled. For example, a powder poured into a cylinder will have a particular bulk density; if the cylinder is disturbed, the powder particles will move and usually settle closer together, resulting in a higher bulk density. Bulk density is a measure of the weight of the litter per unit volume (g/cc). The test method used to measure bulk density comprises a hopper with a pint container underneath. The hopper is filled with approximately 2000 cc of the sample. The gate situated at the bottom of the hopper is opened to fill the pint container with material until it overflows. The container is then leveled out using a straight edge tool and the weight is recorded. The same process is repeated twice and an average of three reps is reported (g/cc or lb/cf).

Referring to FIG. 1, the bulk density of compositions comprising sodium bentonite and from zero to about 95% limestone were measured. FIG. 1 shows the unexpected non-linear relationship between limestone content and bulk density when limestone and sodium bentonite are agglomerated.

Figure 2:
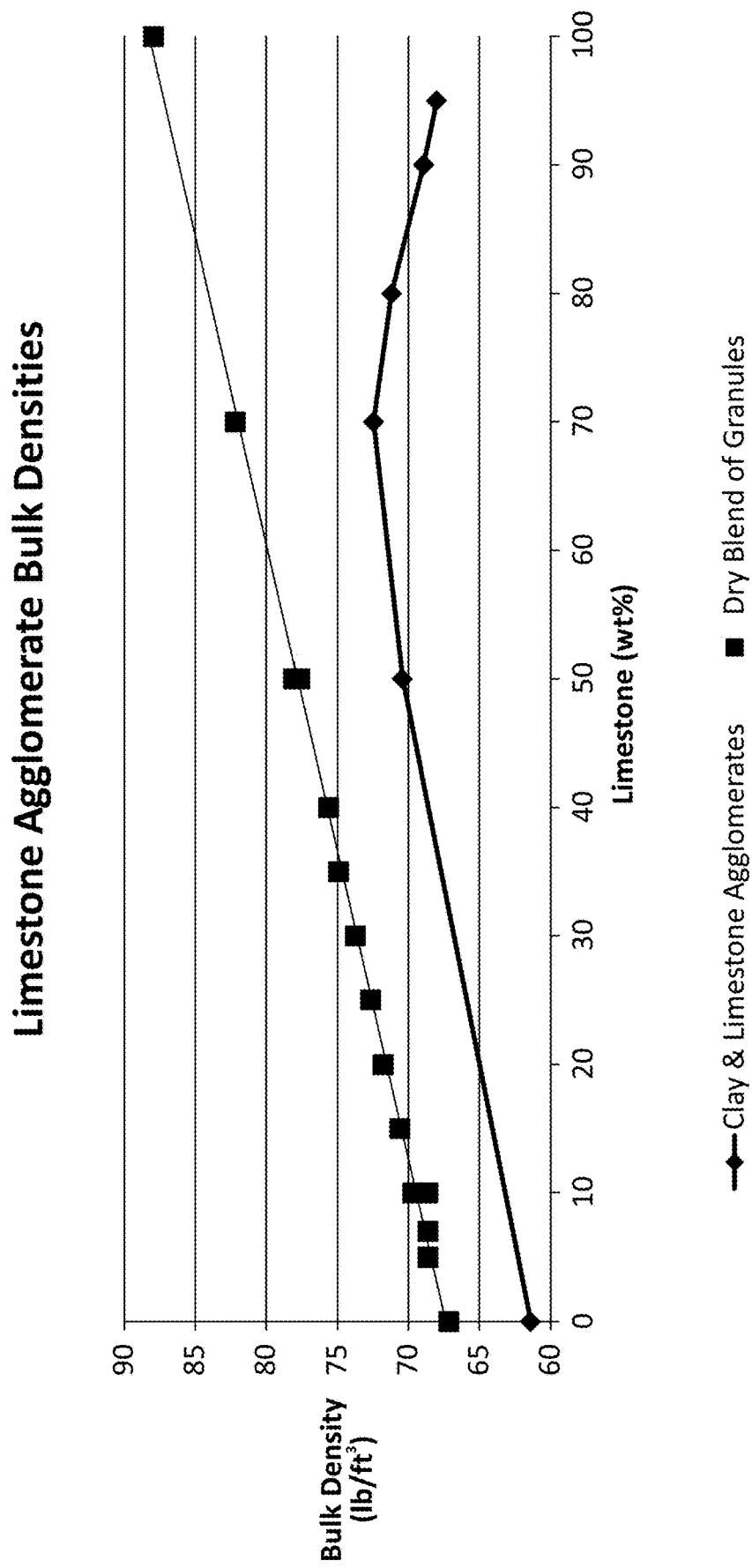
FIG. 2 shows a comparison of product bulk density when dry added and when agglomerated.

The bulk density of a dry added combination of limestone and sodium bentonite was compared to the bulk density of an agglomerated combination of limestone and sodium bentonite. FIG. 2, shows the comparison between the bulk densities of a dry blend and an agglomerated blend.

Figure 3:
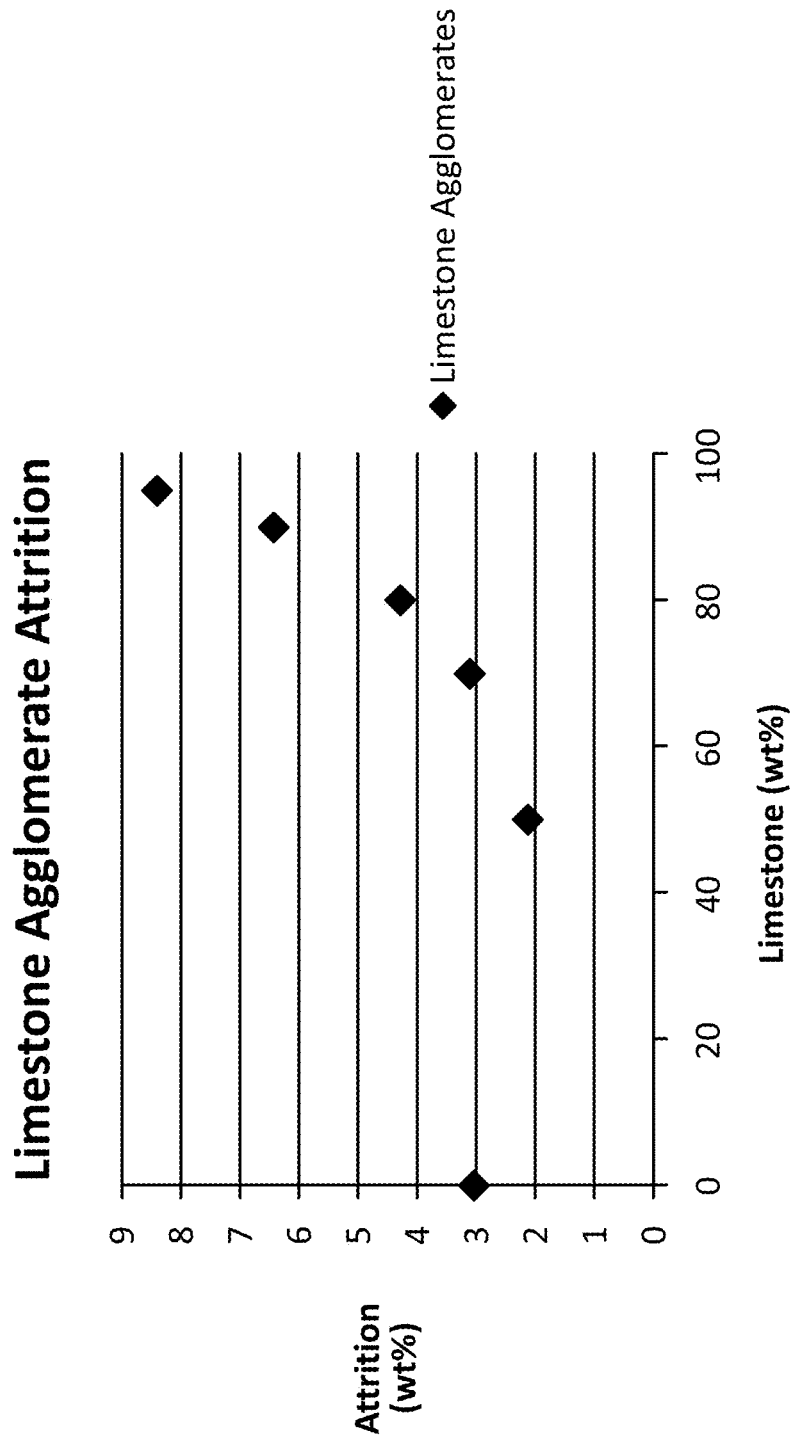
FIG. 3 shows the non-linear relationship between particle attrition and limestone content tested using a modification to ASTM method E-728 Standard Test Method for Resistance to Attrition of Granular Carriers and Granular Pesticides as described below.

Particle attrition was also measured. FIG. 3 shows the non-linear relationship between particle attrition and limestone content. This was unexpected because one would expect to see attrition be significantly higher with 50% filler in the composite particles as compared to a composite particle of 100% sodium bentonite. As FIG. 3 shows, attrition values are comparable at 0% and 50% filler. Attrition values measure the percentage of breakage, size reduction, or fragmentation of the composite particles. As will be described, a modified version of ASTM method E-728 Standard Test Method for Resistance to Attrition of Granular Carriers and Granular Pesticides was used to measure attrition ("Attrition Test Method").

Attrition Test Method

This test was developed as an in-process test to monitor the granule strength of agglomerated litter. It is based on the ASTM designation E 728 Standard Test Method for "Resistance to Attrition of Granular Carriers and Granular Pesticides".

Materials Needed

100 ½-inch carbon steel balls

RoTap with digital timer or additional timer capable of measuring in seconds

Two No. 100 mesh USA Standard Testing Sieves

Bottom pan for sieves

One ⁵⁄₁₆-inch USA Standard Testing Sieve

Stiff sieve brush

Balance

Two 100 cc of product per test

Procedure

First 100 cc Sample
1. Record weight of the first 100 cc sample as Initial Weight-1.
2. Tare a bottom pan, then place one 100-mesh sieve on top of it. Add weighed sample to 100-mesh sieve.
3. RoTap sample for exactly 2 minutes with hammer down.
4. Weigh fines in tared bottom pan and record fines weight as Final Weight-1. Discard fines and material on the 100-mesh sieve.

Second 100 cc Sample
1. Record weight of the second 100 cc sample as Initial Weight-2
2. Distribute second 100 cc sample evenly into a clean bottom pan. Add exactly 100 ½-inch carbon steel balls in a single layer to sample in bottom pan.
3. Place a clean 100-mesh sieve on top of the bottom pan.
4. RoTap for exactly 1.5 minutes with hammer up (disengaged).
5. Tare the second bottom pan.
6. Using the second set of sieves, stack the 5/16-inch, 100-mesh, and the tared bottom pan.
7. Pour the sample and balls from the bottom pan that just came off the RoTap into the 5/16-inch sieve stack. Make sure all material is transferred out of the bottom pan. Manually shake stack to separate balls from sample.
8. After the entire sample has passed through the 5/16-inch sieve, remove sieve and steel balls from stack. Place the 100-mesh sieve and bottom pan with the sample onto the RoTap, and RoTap for exactly 2 minutes with the hammer down.
9. Weigh the fines in the tared bottom pan and record fines weight as Final Weight-2. Discard fines and material on the 100-mesh sieve.
10. Clean 100-mesh sieves as needed with stiff sieve brush.

Calculations

Calculate Attrition (wt %) by determining the weight % change of the fines from before and after it was RoTapped with the steel balls. Attrition (wt %)=[(Final Weight-2/Initial Weight-2)-(Final Weight-1/Initial Weight-1)]×100

Figure 4:
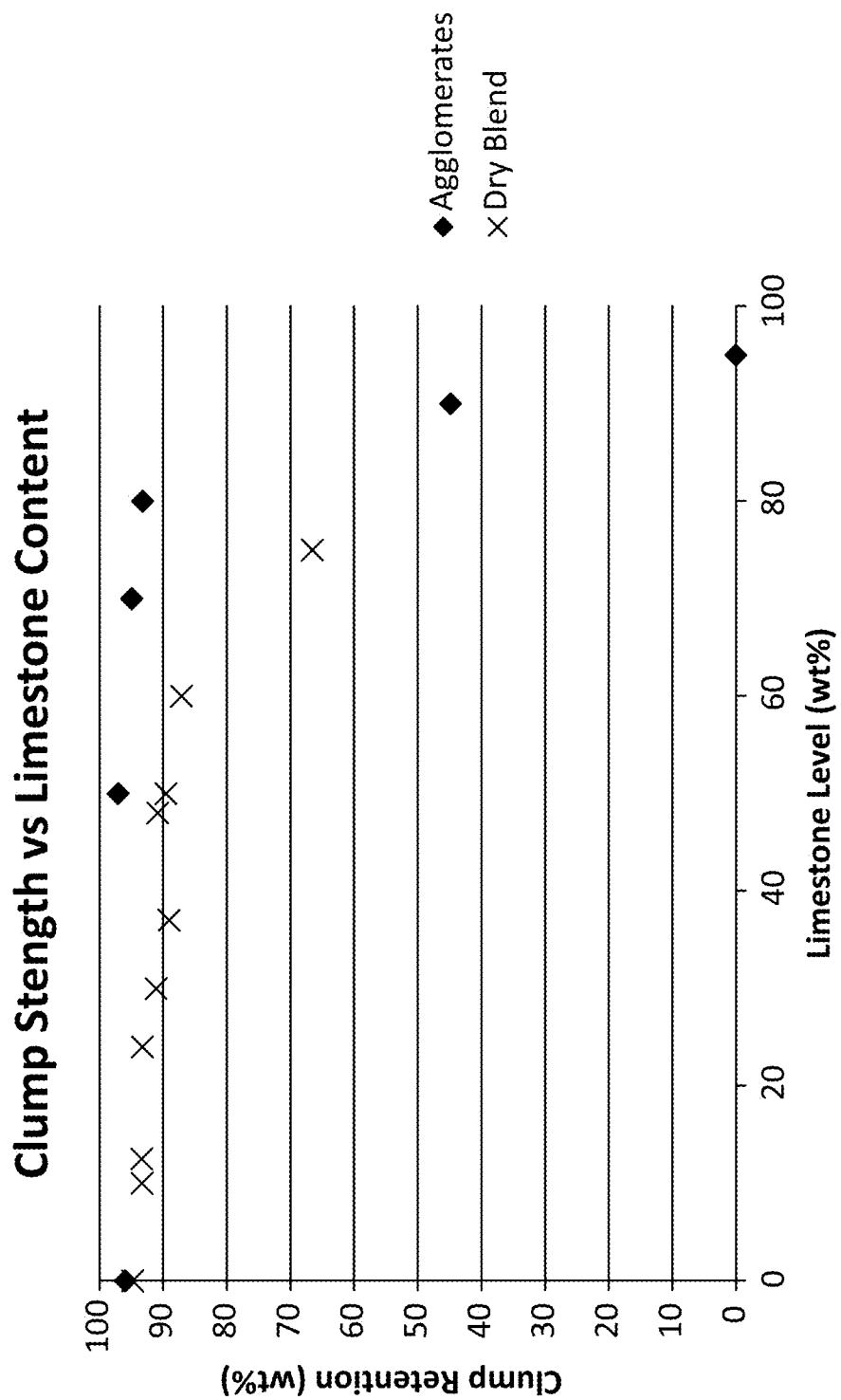
FIG. 4 is a graph showing the clump strength of animal litter as a function of limestone content.
Figure 5:
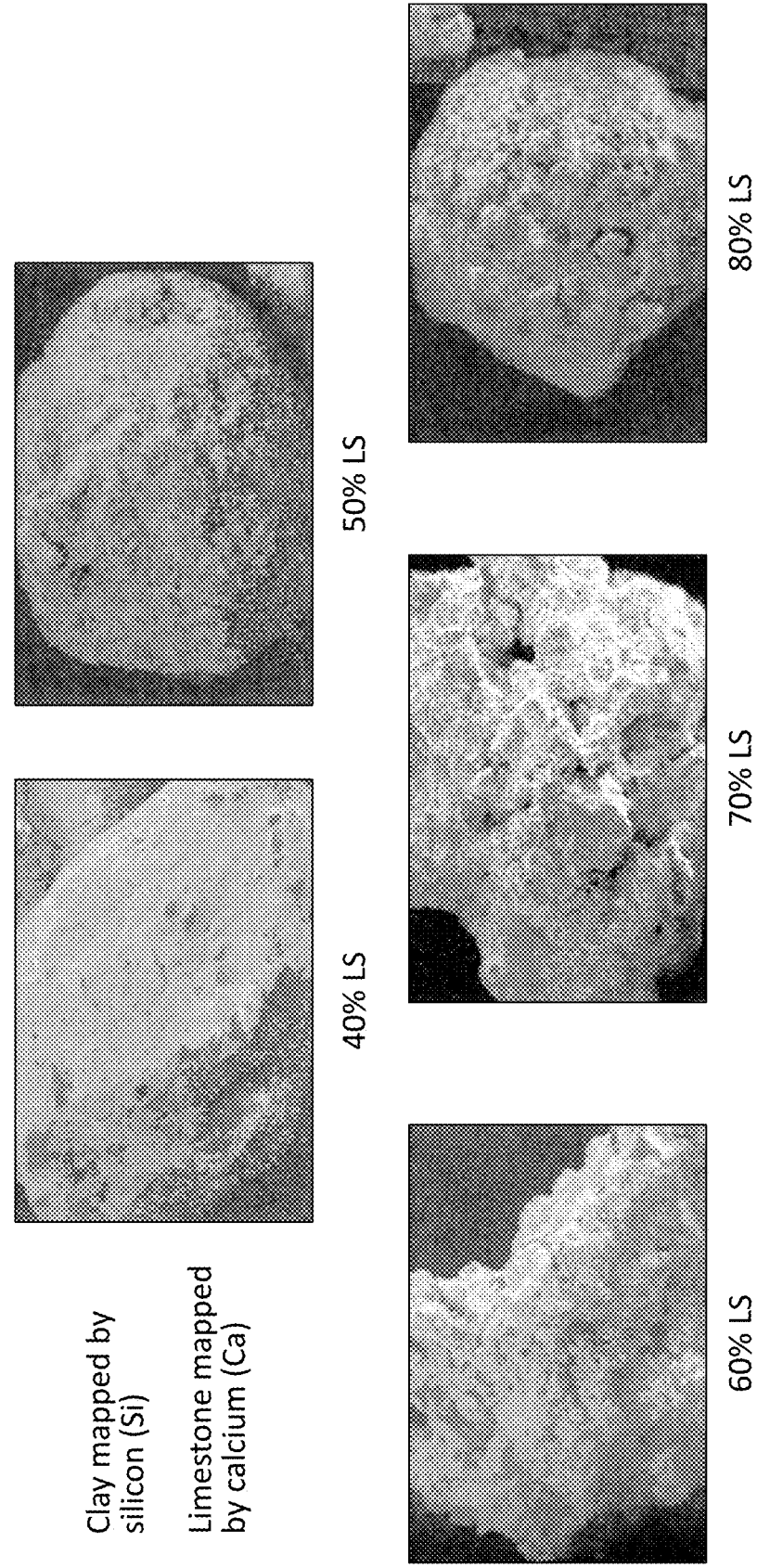
FIG. 5 shows SEM pictures demonstrating the elemental map of the particles as a function of limestone content.

FIG. 4 shows that high clump strength is retained with up to about 80% filler material when the filler material is agglomerated with sodium bentonite using a high shear agglomeration process such as a pin mixer. The clump strength of pure sodium bentonite is between 93% and 98%.

Clump Strength Test Method

Clump strength is measured by first generating a clump by pouring 10 ml of pooled cat urine (from several cats so it is not cat specific) onto a 2 inch thick layer of litter. The urine causes the litter to clump. The clump is then placed on a half inch screen after a predetermined amount of time 3 hours has passed since the particles were wetted. The screen is agitated for 5 seconds with the arm up using a Ro-Tap Mechanical Sieve Shaker made by W.S. Tyler, Inc or other similar device. The percentage of particles retained in the clump is calculated by dividing the weight of the clump after agitation by the weight of the clump before agitation. The clump strength indicates the percentage of particles retained in the clump after 3 hours. Ideally, greater than 90%, and more ideally, greater than 95% of the particles will be retained in a clump after 3 hours upon addition of an aqueous solution, such as deionized water or animal urine. Greater than 80% particle retention in the clump is preferred.

Composite Particle Litter Compositions

Table 1 lists a number of compositions of clumping cat litter prepared either by (1) dry blending granular sodium bentonite and limestone or (2) agglomerating sodium bentonite and powdered limestone into composite particles at the ratios given.

The clump strength, attrition and bulk density were measured for all compositions. Attrition was only measured for the pin-mixed composite particles, as a metric to indicate the strength of the composites. It was not measured on the dry blend because the individual particles were either pure sodium bentonite or limestone, for which attrition values are well established. The results shown in Table 1 below are the average values from several repetitions.

TABLE 1

| Composition | Limestone (%) | Na Bentonite (%) | Method of Mixing | Clump Strength (%) | Attrition (%) | Bulk Density (g/cc) |
|---|---|---|---|---|---|---|
| A | 0 | 100 | N/A | 96.0 | 3.4 | 68.0 |
| B | 100 | 0 | N/A | 0.0 | 1.7 | 88.0 |
| C | 30 | 70 | Dry Blended | 90.0 | N/A | 73.7 |
| D | 40 | 60 | Dry Blended | 88.4 | N/A | 75.6 |
| E | 50 | 50 | Dry Blended | 85.7 | N/A | 77.6 |
| F | 70 | 30 | Dry Blended | 66.6 | N/A | 82.1 |
| I | 50 | 50 | Pin-mixed | 97.1 | 2.1 | 70.4 |
| J | 70 | 30 | Pin-mixed | 94.9 | 3.1 | 72.4 |
| K | 80 | 20 | Pin-mixed | 93.2 | 4.3 | 71.2 |
| L | 90 | 10 | Pin-mixed | 44.8 | 6.4 | 68.9 |
| M | 95 | 5 | Pin-mixed | 0.0 | 8.4 | 68.0 |

Animal Litter Compositions

Although the bentonite/limestone and the bentonite/limestone/PAC composites disclosed herein are suitable for use as an animal litter, using the bentonite/limestone and/or the bentonite/limestone/PAC composites disclosed herein as a component to an animal litter, either alone or dry blended with other litter additives yield excellent results. Combining the bentonite/limestone and/or bentonite/limestone/PAC composites disclosed herein with granular clay particles results in an animal litter that exhibits excellent clump strength, odor control, tracking, color and dust control. Combining the composite particles with granular clay simplifies the manufacturing process of the animal litter. The composite particles may comprise about 2 to about 100 percent by weight of the animal litter.

Odor control of the composite particles disclosed herein when used as an animal litter was found to be comparable to that of a pure sodium bentonite animal litter.

Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A clumping animal litter comprising:
composite particles of a filler material, sodium bentonite, and powdered activated carbon agglomerated together into the composite particles, wherein the filler material comprises from about 50% to about 80% by weight of the composite particles and wherein the sodium bentonite comprises from about 20% to about 50% by weight of the composite particles.

2. The animal litter recited in claim 1, wherein the animal litter has a clump strength of at least 90% as measured by the Clump Strength Test Method.

3. The animal litter recited in claim 1, wherein the filler material comprises at least one of limestone, dolomite, calcite, calcium carbonates, sand, shale, gravel, or slate.

4. The animal litter recited in claim 3, wherein the filler material comprises at least one of limestone or sand.

5. The animal litter recited in claim 3, wherein the filler material comprises limestone.

6. The animal litter recited in claim 1, wherein the composite particles have a bulk density greater than 60 lb/ft$^3$.

7. The animal litter recited in claim 1, wherein a bulk density of the animal litter is at least 10% less than a bulk density of an equivalent weight of a dry blend of sodium bentonite and filler material.

8. The animal litter recited in claim 1, wherein the filler material is present in an amount from about 60% to about 80% by weight of the composite particles.

9. The animal litter recited in claim 1, wherein the filler material is present in an amount of about 70% by weight of the composite particles.

10. The animal litter recited in claim 1, wherein the sodium bentonite is present in an amount of about 30% by weight of the composite particles.

11. The animal litter recited in claim 1, wherein the animal litter has a clump strength of at least 93% as measured by the Clump Strength Test Method.

12. The animal litter recited in claim 1, wherein the animal litter has a clump strength of at least 95% as measured by the Clump Strength Test Method.

13. The animal litter recited in claim 1, wherein the composite particles have a mean particle size from about 0.4 mm to about 2 mm.

14. The animal litter recited in claim 1, wherein the filler material of the composite particles has a mean particle size of 0.5 mm or less.

15. The animal litter recited in claim 1, wherein the sodium bentonite of the composite particles has a mean particle size of 0.25 mm or less.

16. The animal litter recited in claim 1, wherein the powdered activated carbon has a particle size ranging from about 50 microns to about 150 microns.

17. The animal litter recited in claim 1, wherein the powdered activated carbon is present in the animal litter in an amount ranging from about 0.1% to about 2% by weight.

18. A clumping animal litter comprising:
composite particles of a filler material, sodium bentonite, and powdered activated carbon agglomerated together into the composite particles, wherein the filler material comprises from about 50% to about 80% by weight of the composite particles and wherein the sodium bentonite comprises from about 20% to about 50% by weight of the composite particles;
wherein the powdered activated carbon is present in the animal litter in an amount ranging from about 0.1% to about 2% by weight;
wherein the powdered activated carbon has a particle size of less than about 0.25 mm.

19. The animal litter recited in claim 18, wherein the filler material comprises at least one of limestone, dolomite, calcite, calcium carbonates, sand, shale, gravel, or slate.

20. The animal litter recited in claim 19, wherein the filler material comprises at least one of limestone or sand.

* * * * *